United States Patent [19]

Tanaka

[11] Patent Number: 4,649,439
[45] Date of Patent: Mar. 10, 1987

[54] SYSTEM FOR REPRODUCING A VIDEO SIGNAL IN A STILL PICTURE REPRODUCTION

[75] Inventor: Hidenori Tanaka, Yokohama, Japan

[73] Assignee: Victor Company of Japan, Ltd., Yokohama, Japan

[21] Appl. No.: 613,510

[22] Filed: May 23, 1984

[30] Foreign Application Priority Data

May 27, 1983 [JP] Japan .............................. 58-79918[U]

[51] Int. Cl.$^4$ ........................................... H04N 5/783
[52] U.S. Cl. .................................. 360/10.3; 360/10.1; 358/312
[58] Field of Search .................... 360/10.1, 10.2, 10.3, 360/74.1, 74.2, 74.4, 72.2; 358/312

[56] References Cited

U.S. PATENT DOCUMENTS

| | | | |
|---|---|---|---|
| 4,215,378 | 7/1980 | Sato et al. | 360/74.1 |
| 4,246,616 | 1/1981 | Hiraguri et al. | 360/10.2 |
| 4,267,564 | 5/1981 | Flores | 360/74.1 |
| 4,306,255 | 12/1981 | Misaki et al. | 360/10.3 |
| 4,399,473 | 8/1983 | Kaimai et al. | 360/74.1 |
| 4,463,391 | 7/1984 | Takano et al. | 360/10.2 |
| 4,491,878 | 1/1985 | Toba | 360/10.1 |
| 4,531,162 | 7/1985 | Tokumitsu | 360/10.3 |

Primary Examiner—Raymond F. Cardillo
Assistant Examiner—Robert A. Weinhardt
Attorney, Agent, or Firm—Ladas & Parry

[57] ABSTRACT

A system for reproducing a video signal in a still picture reproduction comprises a circuit for generating a still picture reproduction mode signal during a still picture reproduction mode, a circuit for counting a predetermined number of pulses in the rotation detection pulse signal, after the still picture reproduction mode signal is generated, from a point in time when a reproduced control pulse signal or a signal in phase with the reproduced control pulse signal is first obtained as a reference signal, and for generating a rotation stopping signal as an output signal when the predetermined number of pulses are counted, a circuit responsive to the still picture reproduction mode signal, for reducing a voltage which is applied to a capstan motor, and a circuit for stopping the rotation of the capstan motor responsive to the rotation stopping signal which is obtained after the voltage applied to the capstan motor has been reduced and a rotational speed of the capstan motor has decreased. The predetermined number is selected to a value so that a magnetic tape stops moving at a position where a noise in a reproduced picture which is obtained from a video signal reproduced by rotary video heads is a minimum.

6 Claims, 6 Drawing Figures

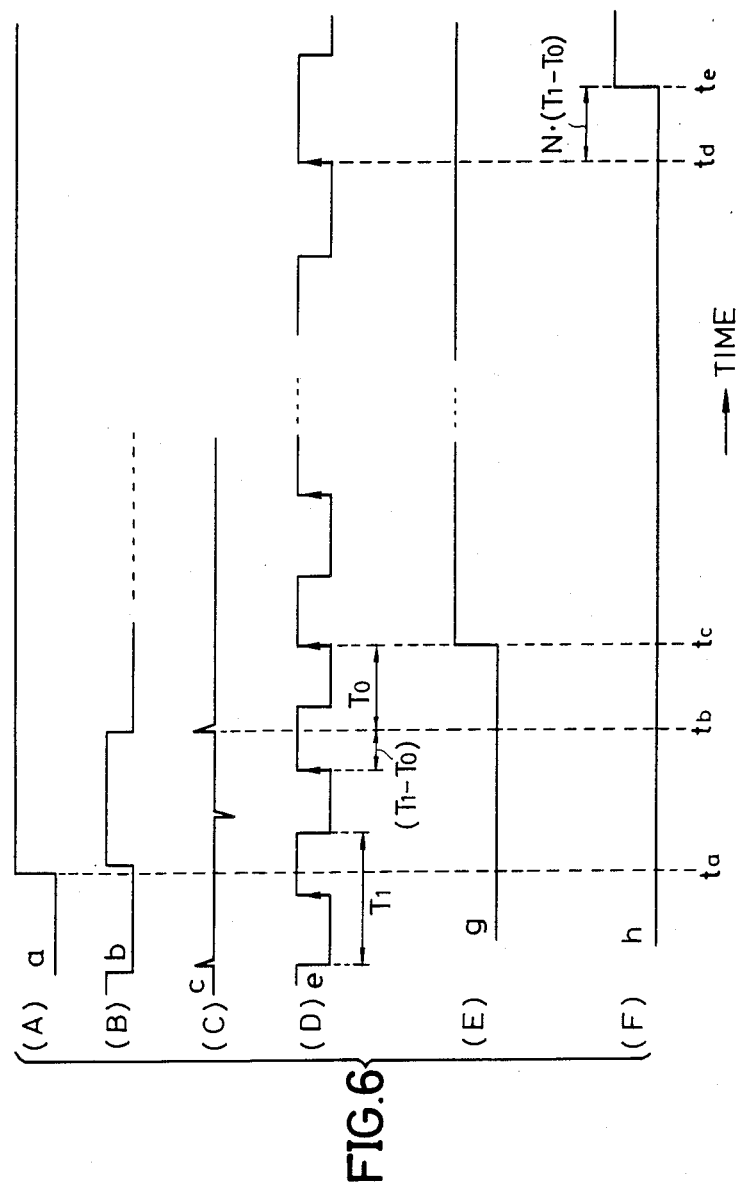

SYSTEM FOR REPRODUCING A VIDEO SIGNAL IN A STILL PICTURE REPRODUCTION

BACKGROUND OF THE INVENTION

The present invention generally relates to systems for reproducing a video signal in a still picture reproduction, and more particularly to a still picture reproduction system for carrying out a still picture reproduction in a state where a magnetic tape is stopped at a position such that a noise does not appear in a reproduced picture, when carrying out the still picture reproduction by stopping the moving magnetic tape during a normal reproduction mode in which a pre-recorded video signal is reproduced from the moving magnetic tape.

Generally, when carrying out a still picture reproduction in a state where a video tape recorder is in a normal reproduction mode, for example, a moving magnetic tape is stopped. Video tracks formed obliquely to a longitudinal direction on the tape, having a video signal pre-recorded thereon, are repeatedly scanned by a plurality of rotary heads. During such a still picture reproduction mode, the inclination angle of scanning loci of the rotary heads with respect to the tape, is different from the inclination angle of the recorded video tracks. For this reason, a reproduced picture is obtained normally while a reproducing head scans over a recorded track which has been formed by a recording head having a gap of the same azimuth angle as the gap of the reproducing head. However, when the reproducing head deviates from this recorded track and scans over a recorded track which has been recorded by a recording head having a gap of an azimuth angle which is different from the azimuth angle of the gap of the reproducing head, the level of the reproduced output decreases and a noise is introduced in the reproduced picture.

In order to make sure that the noise appears at an inconspicuous position in the reproduced picture, the moving tape should be stopped at a predetermined position where the reproducing head scans over the track on the tape so that a point when the level of the reproduced video signal becomes a minimum is located within or in a vicinity of a vertical blankinq period of the video signal. Various systems have been previously proposed in order to stop the moving at the above predetermined position.

For example, a still picture reproduction system was proposed in a U.S. Pat. No. 4,246,616 in which the assignee is the same as the assignee of the present application.

In the conventional still picture reproduction system for reproducing the video signal, the video signal is recorded on video tracks on the tape. The video tracks extend obliquely to the longitudinal direction of the tape, with substantially no gap formed between the adjacent video tracks. A control signal is recorded on a control track which extends in the longitudinal direction of the tape, and the video tracks are formed by a plurality of rotary video heads having gaps of mutually different azimuth angles. The control signal is recorded on the control track interrelatedly with the formation of the video tracks by the video heads. A motor drives the tape to move or to stop. The plurality of video heads successively scan over the video tracks to pick up and reproduce the pre-recorded video signals. The gaps of the video heads have different height positions above the plane of rotation of the center of the tracks in the width direction of the track. The control signal is reproduced from the control track on the moving tape. A circuit delays the reproduced control signal by a predetermined delay time, to obtain a delayed signal, and this delayed signal is used to stop the motor and to stop the moving tape. The moving tape is stopped at a position relative to the video heads which perform the reproduction, so that the point when the level of the reproduced video signal becomes a minimum is within or in a vicinity of the vertical blanking period of the video signal. In the present specification, this position where the noise in the reproduced picture becomes a minimum, will simply be referred to as a most suitable position.

When carrying out the still picture reproduction, it is necessary to stop the moving tape at the most suitable position with respect to the video heads, by tape movement stopping means. Conventionally, as such tape movement stopping means, there was means for immediately stopping the rotation of a capstan motor by short-circuiting terminals of the capstan motor, means for stopping the moving tape by using the inertia of a capstan and a flywheel and by taking into account the magnitude of the braking with respect to the capstan motor, and means provided with a second control head for immediately stopping the rotation of the capstan motor when this second control head reproduces a control pulse.

However, in the above conventional tape movement stopping means, although the reproduced control signal is used as a reference signal for stopping the moving tape, there is no feedback to determine whether the noise is actually within the vertical blanking period and does not appear at a conspicuous position in the reproduced picture. Thus, after the control pulse is detected, a discrimination could not be performed to determine whether the moving tape had actually stopped at the most suitable position. Accordingly, in the conventional still picture reproduction system, when the various conditions with respect to the mechanisms in the video tape recorder changed as the video tape recorder was used for a long time, it became necessary to re-adjust the tracking every time such a change occurred. Such a change in the conditions included a stretch in a belt which transmits a rotational force to the capstan, a change in a frictional drag in a tape moving system, and the like, for example.

Another system was proposed in a U.S. Pat. Application S.N.389,241 filed June 17, 1982 and entitled "VIDEO SIGNAL SLOW-MOTION OR STILL PICTURE REPRODUCTION SYSTEM", now U.S. Pat. No. 4,531,162, in which the assignee is the same as the assignee of the present application. According to this proposed system, the level of the reproduced FM signal is detected while the tape moves at a speed which is slower than the tape moving speed at the time of the recording. The moving tape is stopped at a position where a minimum level of the reproduced FM signal occurs in a duration in which a head switching pulse is generated, which duration corresponds to the vertical blanking period. However, according to this proposed system, it was necessary to provide a detecting circuit which comprises a comparator or the like for detecting the minimum level of the reproduced FM signal, in addition to the video signal reproducing circuit. Further, the level of the reproduced FM signal changed depending on the state of contact between the tape and the head. For this reason, the minimum level of the reproduced FM signal could not always be detected accurately, and this proposed system suffered a disadvantage in that the moving tape could not be accurately stopped at the most suitable position when such a change occurred in the level of the reproduced FM signal.

SUMMARY OF THE INVENTION

Accordingly, it is a general object of the present invention to provide a novel and useful still picture reproduction system for reproducing a video signal, in which the problems described heretofore have been eliminated.

Another and more specific object of the present invention is to provide a still picture reproduction system in which a feedback control is carried out by stopping a capstan motor after a predetermined number of pulses having a period dependent on a rotational speed of a capstan is counted from a point when a first reference signal is obtained after a manipulation of a still picture reproduction switch in a normal reproduction mode of a video tape recorder. According to the system of the present invention, even when a stretch occurs in a belt which transmits a rotation to the capstan or there is a change in a frictional drag in a tape moving system as the video tape recorder is used for a long time, for example, it is possible to accurately stop a moving tape at a most suitable position where a noise reproduced from the tape appears at an inconspicuous position in a reproduced picture. The system according to the present invention does not employ means for detecting a minimum level of a reproduced FM signal as in the case of the previously proposed system described before, and for this reason, it is possible to stop the moving tape at the most suitable position independently of the state of contact between the tape and the head.

Still another object of the present invention is to provide a still picture reproduction system in which the moving tape is stopped after reducing the tape moving speed to a speed which is 1/N times the tape moving speed for a normal reproduction, where N is a natural number greater than or equal to two, after manipulation of the still picture reproduction switch. According to the system of the present invention, it is possible to accurately stop the moving tape at the most suitable position, and it is therefore possible to carry out a still picture reproduction satisfactorily.

Other objects and further features of the present invention will be apparent from the following detailed description when read in conjunction with the accompanying drawings.

BRIEF DESCRIPTION OF THE DRAWINGS

FIGS.6(A) through 6(F) show signal waveforms at each part of the block system shown in FIG.5.

DETAILED DESCRIPTION

Figure 1:
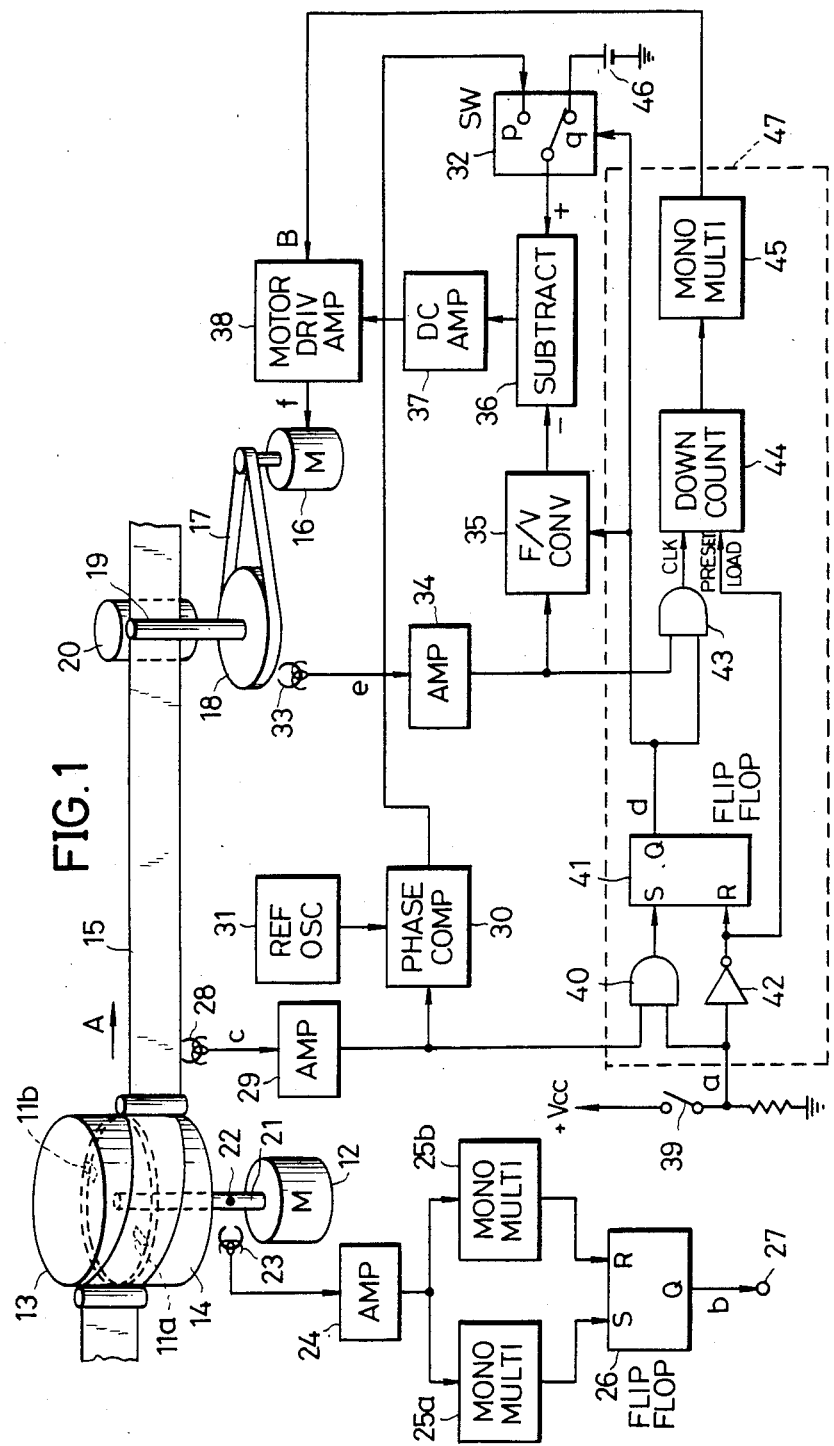
FIG.1 is a systematic block diagram showing a first embodiment of a still picture reproduction system according to the present invention.

FIG.1 shows a first embodiment of a still picture reproduction system according to the present invention. In FIG.1, video heads 11a and 11b have gaps of mutually different azimuth angles. These video heads 11a and 11b are mounted diametrically on a rotary drum 13 which is rotated at a rotational speed of 30 rps by a motor 12. A magnetic tape 15 is wrapped around respective peripheral surfaces of the rotary drum 13 and a stationary drum 14, and is driven by a capstan 19 and a pinch roller 20. The capstan 19 is rotated by a motor 16, through a belt 17 and a flywheel 18. The tape 15 is driven and moved in the direction of an arrow A in a state where the tape 15 is pinched between the capstan 19 and the pinch roller 20. A frequency modulated (FM) video signal is recorded on tracks which are formed obliquely to a longitudinal direction of the tape 15. One field of the FM video signal is recorded in each oblique track. A control signal is recorded on a control track which is formed in the longitudinal direction of the tape 15 along a lower edge thereof.

A magnet 22 is provided on a rotary shaft 21 which is driven by the motor 12 and is rotated unitarily with the rotary drum 13. A pickup head 23 is located at a position opposing the magnet 22. While the motor 12 rotates, the pickup head 23 produces a pulse every time the magnet 22 passes in front of the pickup head 23. The output pulses of the pickup head 23 are supplied to monostable multivibrators 25a and 25b, through an amplifier 24. The monostable multivibrators 25a and 25b are respectively triggered responsive to a leading edge and a trailing edge of the output pulses of the pickup head 23. Output signals of the monostable multivibrators 25a and 25b are respectively applied to a set terminal S and a reset terminal R of a flip-flop 26. The flip-flop 26 produces a square wave b shown in FIG.2(B), through an output terminal 27. The polarity of the square wave b reverses for every one track scanning duration of the video head, and this square wave b has a period of two track scanning durations.

Figure 2:
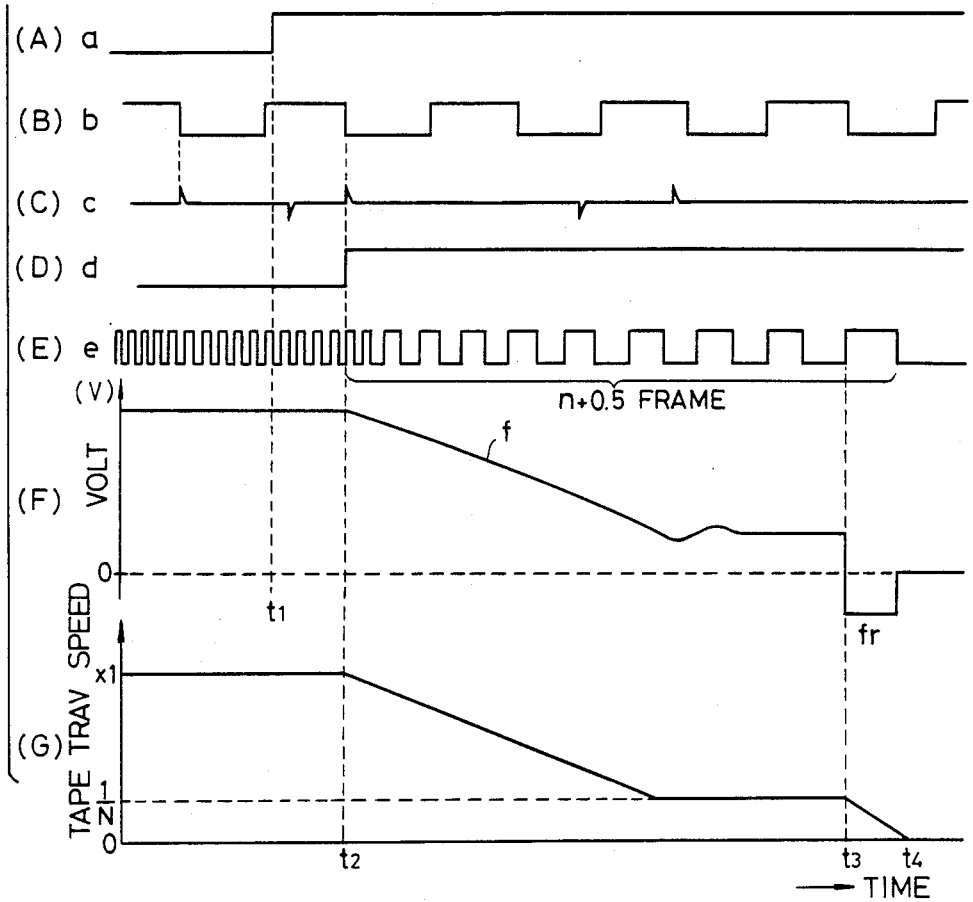
FIGS.2(A) through 2(F) show signal waveforms at each part of the block system shown in FIG.1.
FIG.2(G) shows a change in a tape moving speed.

During a normal reproducing mode, a control pulse signal c shown in FIG.2(C) having a period of one frame (two fields) is reproduced from the moving tape 15 by a control head 28. The reproduced control pulse signal c is passed through an amplifier 29, and is supplied to a phase comparator 30 and to one input terminal of an AND-gate 40. The phase comparator 30 compares the phase of the reproduced control pulse signal c with the phase of a reference signal which is produced from a reference oscillator 31. An output phase error signal of the phase comparator 30, is applied to a terminal p of a switching circuit 32. During the normal reproduction mode, the switching circuit 32 is connected to the terminal p, and the output phase error signal of the phase comparator 30 is supplied to a subtracting circuit 36 through the switching circuit 32.

On the other hand, a rotation detection pulse signal e shown in FIG.2(E) is produced from a capstan pickup head 33 which cooperates with the flywheel 18. This rotation detection pulse signal e has a frequency dependent on the rotational speed of the capstan 19. The rotation detection pulse signal e is passed through an amplifier 34, and is supplied to a frequency-to-voltage (F/V) converter 35 wherein the amplified rotation detection pulse signal e is subjected to a frequency-to-voltage conversion. An output voltage of the F/V converter 35 is supplied to the subtracting circuit 36. An output voltage of the subtracting circuit 36 which is produced as a result of a subtraction performed therein, is amplified in a D.C. amplifier 37, and is then supplied to a motor driving amplifier 38. An output signal of the motor driving amplifier 38 is supplied to the capstan motor 16, so as to control the rotational speed and the rotational phase of the capstan motor 16 to constant values.

Next, description will be given for a case where the mode is changed to a still picture reproduction mode. It will be assumed that a still picture reproduction switch 39 is closed at a time $t_1$, during the normal reproduction mode described heretofore. A still picture reproduction mode signal a shown in FIG.2(A) which assumes a high level at the time $t_1$, is then supplied to the other input terminal of the AND-gate 40, so as to open this gate. In addition, the signal a is applied to a reset terminal R of an R-S type flip-flop 41, through an inverter 42, so as to reset the flip-flop 41. The output of the inverter 42 is also applied to a load terminal of a down-counter 44 so as to load a predetermined preset value. The predetermined preset value of the down-counter 44 is selected to a value which is equal to a number of pulses produced from the capstan pickup head 33, from a time $t_2$ when a first pulse in the reproduced control pulse signal c is obtained after the time $t_1$ when the still picture reproduction mode signal a was obtained, until the moving tape 15 is stopped at the most suitable position described before.

When the pulse in the reproduced control pulse signal c is obtained at the time $t_2$ after the time $t_1$ as shown in FIG.2(C), this pulse is passed through the AND-gate 40 and is applied to a set terminal S of the flip-flop 41 so as to set this flip-flop 41. Accordingly, a signal d shown in FIG.2(D) which assumes a high level at the time $t_2$, is produced through a Q-output terminal of the flip-flop 41. The signal d is applied to the F/V converter 35 so as to switch the operating point of the F/V converter 35 to an operating point which corresponds to a tape moving speed which is 1/N times the tape moving speed at the time of the normal reproduction, where N is a natural number greater than or equal to two. At the same time, the signal d is applied to the switching circuit 32 so as to switchover and connect the switching circuit 32 to a terminal q, and the signal d is also supplied to an AND-gate 43 so as to open this gate.

When the switching circuit 32 is switched over and connected to the terminal q, a predetermined reference voltage from a reference voltage source 46 is supplied to the subtracting circuit 36 through the switching circuit 32. The subtracting circuit 36 performs a subtraction between the predetermined reference voltage and the output voltage of the F/V converter 35 which has been switched of its operating point as described before. As a result, after the time $t_2$, an output voltage f of the motor driving amplifier 38 gradually decreases as shown in FIG.2(F). After a point when the rotational speed of the capstan motor 16 finally reaches a rotational speed corresponding to the tape moving speed which is 1/N times the tape moving speed at the time of the normal reproduction, the voltage f assumes a constant low value. Therefore, the period of the rotation detection pulse signal e which is produced from the capstan pickup head 33, gradually becomes longer after the time $t_2$ as shown in FTG.2(E). The rotation detection pulse signal e is supplied to the F/V converter 35 on one hand, and is supplied to the AND-gate 43 on the other. An output signal of the AND-gate 43 is supplied to a clock terminal of the down-counter 44, as a clock signal, so as to start the down-counting operation of the down-counter 44.

As the down-counter 44 performs the down-counting operation and the rotation detection pulse signal e is counted down by the preset value, the down-counter 44 produces a borrow signal at a time $t_3$. This borrow signal is applied to a monostable multivibrator 45, so as to trigger this monostable multivibrator 45 by the borrow signal. When the monostable multivibrator 45 is triggered by the borrow signal, the monostable multivibrator 45 produces a pulse signal having a predetermined pulse width. This output pulse signal of the monostable multivibrator 45 is applied to a brake signal input terminal B of the motor driving amplifier 38. Hence, the motor driving amplifier 38 produces a voltage for rotating the capstan motor 16 is a direction opposite to the rotating direction at the time of the normal reproduction, for the duration of the predetermined pulse width of the output pulse signal of the monostable multivibrator 45, for example, as indicated by $f_r$ in FIG.2(F). This voltage produced from the motor driving amplifier 38 becomes zero after the duration of the above predetermined pulse width.

Accordingly, the moving speed of the tape 15 gradually decreases after the time $t_2$ as shown in FIG.2(G), and reaches the moving speed which is 1/N times the moving speed at the time of the normal reproduction. Thereafter, a braking operation is performed with respect to the capstan motor 16 from the time $t_3$, and the tape 15 stops moving (that is, the tape moving speed becomes zero) within an extremely short period of time.

A specific duration between the times $t_2$ and $t_3$ is the time it took for the down-counter 44 to count down the output rotation detection pulse signal e of the capstan pickup head 33 by the preset value. This specific duration corresponds to the time it took for the tape 15 to move up to the most suitable position during the still picture reproduction. For example, a distance over which the tape 15 moves in this specific duration, is equal to a distance the tape 15 moves during the normal reproduction so that n+0.5 frames of the video signal are reproduced, where n is zero or an integral number. In the present embodiment, the above specific duration is selected to a duration of 4.5 frames of the video signal, that is, to a time of 0.15 second. In addition, in the specific duration between the times $t_2$ and $t_3$, the feedback control by the counting of the rotation detection pulse signal e is carried out with respect to the capstan motor 16. An open loop control is carried out from the time $t_3$ until a time $t_4$ when the tape moving speed becomes zero. In order to stop the moving tape 15 at a position which is extremely close to the most suitable position, it is desirable to make a duration between the times $t_3$ and $t_4$ extremely short. To do this, it is desirable to set the tape moving speed which is 1/N times the tape moving speed at the time of the normal reproduction, to a slowest possible speed.

Figure 3:
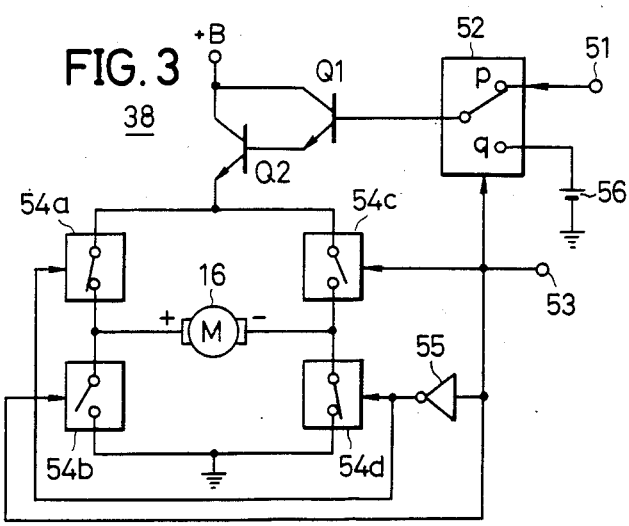
FIG.3 is a circuit diagram showing the principle of a motor driving amplifier in the block system shown in FIG.1.

A circuit diagram showing the principle of the motor driving amplifier 38 which produces the voltage f described before, is shown in FIG.3. The output signal of the D.C. amplifier 37 is applied to a terminal p of an electronic switch 52, through a terminal 51. Normally, the electronic switch 52 is connected to the terminal p, and no input signal is applied to a terminal 53. Switches 54a and 54d are coupled to the motor 16, and are controlled by a signal which is obtained from the terminal 53 through an inverter 55. On the other hand, switches 54b and 54c are coupled to the motor 16, and are controlled by a signal which is obtained directly from the terminal 53. Since there is no input to the terminal 53, the switches 54a and 54d are closed, and the switches 54b and 54c are open. Accordingly, the voltage applied to the terminal 51 is applied to transistors Q1 and Q2, and a current from a power source +B flows in a forward direction to the motor through the switches 54a and 54d, according to the above voltage. The motor 16 is thus rotated in a forward direction up to the time $t_3$. When there is an output at the monostable multivibrator 45 at the time $t_3$, this output of the monostable multivibrator 45 is applied to the terminal 53 which corresponds to the brake signal input terminal B described before. The switches 54b and 54c are hence closed, and the switches 54a and 54d are opened. In addition, the electronic switch 52 is switched over and connected to a terminal q responsive to the signal from the terminal 53. As a result, the base of the transistor Q1 becomes coupled to a constant reference voltage source 56. Therefore, while the output of the monostable multivibrator 45 is applied to the terminal 53, the motor 16 rotates in a reverse direction, and the moving tape 15 is quickly stopped.

Figure 4:
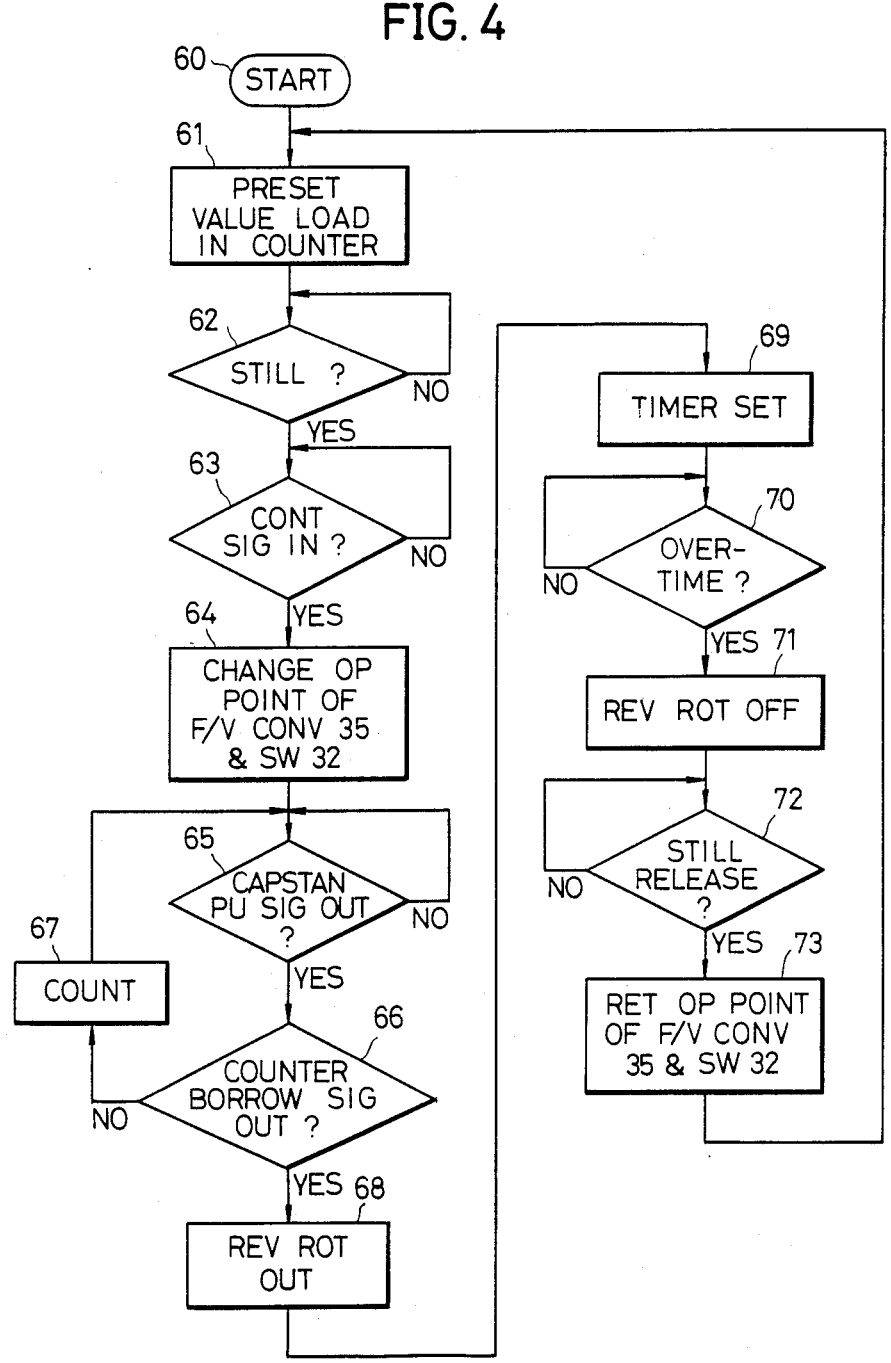
FIG.4 is a flow chart for explaining the operation of a microcomputer when a part of the block system shown in FIG.1 is constituted by the microcomputer.

In the block system shown in FIG.1, a part 47 encircled by phantom lines, including the AND-gate 40, the flip-flop 41, the inverter 42, the AND-gate 43, the down-counter 44, and the monostable multivibrator 46, may be constituted by a microcomputer. In this case, the microcomputer performs operations which will be described hereinafter in conjunction with the flow chart shown in FIG.4. The operation of the microcomputer is started from a step 60. A preset value is loaded into a counter in a step 61. A step 62 discriminate whether a still picture reproduction mode has been selected. When the discrimination result in the step 62 is YES, a subsequent step 63 discriminates whether a reproduced control signal has been obtained. When the discrimination result in the step 63 is YES, the operating point of the F/V converter 35 is switched and the electronic switch 32 is connected to the terminal q in a step 64. Next, a step 65 discriminates whether there is a detection pulse from the capstan pickup head 33. When the discrimination result in the step 65 is YES, a subsequent step 66 discriminates whether a borrow signal has been produced from the counter. On the other hand, when the discrimination result in the step 65 is NO, the counting operation of the counter is continued in a step 67, and the operation returns to the step 65. This operation is repeated until the discrimination result in the step 66 becomes YES.

When the discrimination result in the step 66 becomes YES, an output for rotating the motor 16 in the reverse direction is produced in a step 68. A timer is set in a step 69, and a step 70 discriminates whether the timer has reached an over-time. When the discrimination result in the step 70 is YES, a step 71 turns OFF the reverse rotation of the motor 16. A step 72 opens the switch 39 and discriminates whether the still reproduction mode has been cancelled. When the discrimination result in the step 72 is YES, the operating point of the F/V converter 35 is returned to the normal operating point and the electronic switch 32 is connected back to the terminal p in a step 73.

Figure 5:
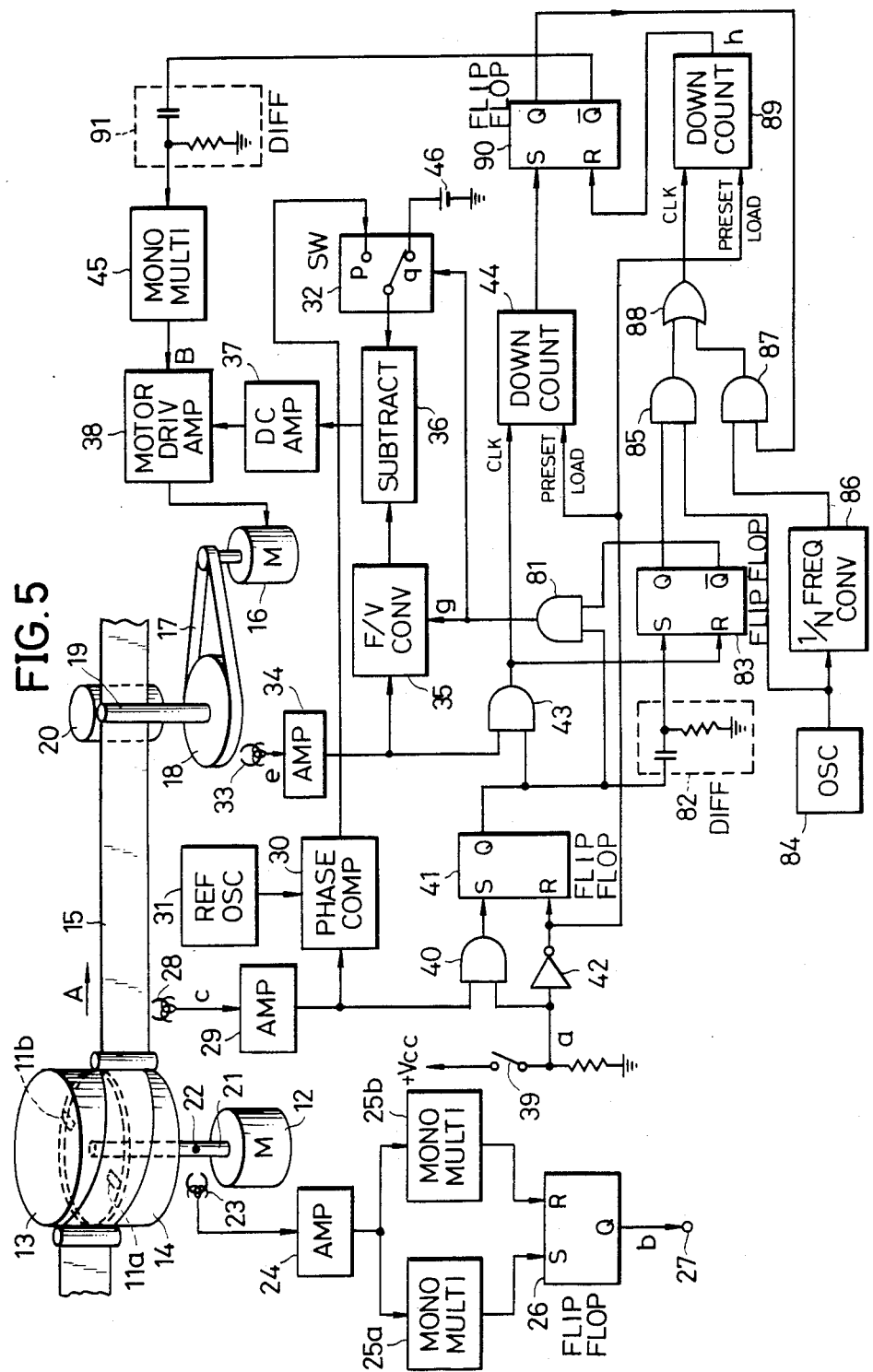
FIG.5 is a systematic block diagram showing a second embodiment of a still picture reproduction system according to the present invention.

Next, description will be given with respect to a second embodiment of a still picture reproduction system according to the present invention, by referring to FIGS.5 and 6. In FIG.5, those parts which are the same as those corresponding parts in FIG.1 are designated by the same reference numerals, and their description will be omitted. In this second embodiment, the operation during the normal reproduction is the same as that in the first embodiment described previously.

When the still picture reproduction switch 39 is closed at a time $t_a$, a still picture reproduction mode signal a (same as the signal a shown in FIG.2(A)) which assumes a high level from the time $t_a$ as shown in FIG.6(A), is applied to one input terminal of the AND-gate 40 to open this gate. The signal a is also supplied to the inverter 42. The output signal of the inverter 42 is applied to the reset terminal R of the flip-flop 41 and to respective preset load terminals of down-counters 44 and 89. As a result, predetermined preset values are loaded into the down-counters 44 and 89.

A preset value P of the down-counter 89 is selected to a ratio T1/T2, where T2 is the period of an oscillation output from an oscillator 84 having a frequency $f_0$, and T1 is the period of a rotation detection pulse signal e (same as the signal e shown in FIG.2(E)) shown in FIG.6(D) which is produced from the capstan pickup head 33 during the normal reproduction. The oscillator 84 will be described later on in the specification. The frequency of the rotation detection pulse signal e is higher than the frequency of the reproduced control pulse signal c, as in the above first embodiment.

It will be assumed that the first reproduced control pulse signal c which is obtained from the control head 28 after the time $t_a$, is obtained at a time $t_b$ as shown in FIG.6(C). The flip-flop 41 is set responsive to this reproduced control pulse signal c which is obtained at the time $t_b$. When the flip-flop 41 is set, the Q-output thereof assumes a high level. Accordingly, the high-level Q-output of the flip-flop 41 is supplied to the AND-gate 43 to open this gate. The high-level Q-output of the flip-flop 41 is also applied to a set terminal S of an R-S type flip-flop 83, through a differentiating circuit 82, so as to set the flip-flop 83. When the flip-flop 83 is set, an AND-gate 81 which is applied with a Q-output of the flip-flop 83 is closed. On the other hand, an AND-gate 85 which is applied with a Q-output of the flip-flop 83 is opened. As a result, an output pulse signal (having a period which is considerably small compared to the period T1 of the rotation detection pulse signal e during the normal reproduction) of the oscillator 84 is passed through the AND-gate 85 and an OR-gate 88, and is supplied to the down-counter 89 wherein the signal is counted down.

The flip-flop 83 is reset by the output signal of the AND-gate 43, at a time $t_c$ when the output rotation detection pulse signal e of the capstan pickup head 33 first rises after the time $t_b$ as shown in FIG.6(D). In addition, the down-counter 44 starts the down-counting of the rotation detection pulse signal e from this time $t_c$. When the flip-flop 83 is reset at the time $t_c$, a high-level signal g shown in FIG.6(E) is produced from the AND-gate 81. This high-level signal g is supplied to the F/V converter 35 to switchover the operating point thereof to the operating point corresponding to the tape moving speed which is 1/N times the tape moving speed at the time of the normal reproduction. Further, the switching circuit 32 is switched over and connected to the terminal q responsive to this high-level signal g. At the same time, due to the resetting of the flip-flop 83, the Q-output of the flip-flop 83 assumes a low level. Thus, the AND-gate 85 is closed by the low-level Q-output of the flip-flop 83, and the supply of the output oscillation pulse signal of the oscillator 84 to the down-counter 89 is blocked. Hence, the down-counting operation of the down-counter 89 is interrupted.

Accordingly, in a duration T0 between the times $t_b$ and $t_c$, the down-counter 89 down-counts the output oscillation pulse signal of the oscillator 84. The counted value in the down-counter 89 becomes equal to $P-(T0/T2)$ which is the result obtained by subtracting T0/T2 from the preset value P. The down-counting operation of the down-counter 89 is once stopped in this state.

After the time $t_c$, the tape moving speed is gradually decreased as in the case of the first embodiment described previously, and the tape moving speed assumes the tape moving speed which is 1/N times the tape moving speed at the time of the normal reproduction. The down-counting of the rotation detection pulse signal e after the time $t_c$ when the tape moves at the low speed, is performed by the down-counter 44. At a time $t_d$ when the down-counter 44 finishes the down-counting by the predetermined preset value thereof, the borrow signal produced from the down-counter 44 is supplied to a set terminal S of an R-S type flip-flop 90 so as to set the flip-flop 90. When the flip-flop 90 is set at the time $t_d$, a high-level signal is produced through a Q-output terminal of the flip-flop 90. This high-level Q-output of the flip-flop 90 is supplied to an AND-gate 87 to open this gate. Accordingly, a frequency divided pulse signal obtained from a frequency divider 86 which frequency-divides the output oscillation pulse signal of the oscillator 84 by 1/N, is applied to a clock input terminal of the down-counter 89, through the AND-gate 87 and the OR-gate 88. The down-counter 89 starts the down-counting operation from the time $t_d$.

When the down-counter 89 finishes the down-counting of the frequency divided pulse signal from the frequency divider 86 by the value $P-(T0/T2)$ at a time $t_e$, a high-level borrow signal h shown in FIG.6(F) is produced from the down-counter 89. This high-level borrow signal h is applied to a reset terminal R of the flip-flop 90. As a result, the flip-flop 90 is reset at the time $t_e$, and the AND-gate 87 is closed by the Q-output of the flip-flop 90. In addition, a high-level signal is produced from the $\overline{Q}$-output terminal of the flip-flop 90. This high-level $\overline{Q}$-output of the flip-flop 90 is applied to the monostable multivibrator 45 through a differentiating circuit 91, to trigger the monostable multivibrator 45. Consequently, a pulse signal having a constant pulse width is produced from the monostable multivibrator 45, and is supplied to the brake signal input terminal B of the motor driving amplifier 38. As in the case of the first embodiment described previously, the capstan motor 16 is applied with a reverse voltage and is braked for the duration of this pulse width, and the motor driving voltage is thereafter reduced to zero. According to this second embodiment, the capstan motor 16 is braked and the moving tape 15 is stopped at the time $t_e$ which occurs after the time $t_d$ when the borrow signal is produced from the down-counter 44.

A delay time $t_e-t_d$ corresponds to a duration in which $P-(T0/T2)$ pulses are produced from the 1/N-frequency divider 86. Moreover, the output pulse signal produced from the 1/N-frequency divider 86 has a period NT2. Hence, the delay time $t_e-t_d$ can also be described by $N(T1-T0)$. In this duration of $N(T1-T0)$, the tape 15 moves at the tape moving speed which is 1/N times the tape moving speed at the time of the normal reproduction. Thus, a distance over which the tape 15 moves in this duration of $N(T1-T0)$, is equal to the distance over which the tape 15 moves in the duration $(T1-T0)$ between the time $t_b$ when the tape 15 moves at the tape moving speed at the time of the normal reproduction and the time immediately prior to the time $t_b$ when the leading edge of the rotation detection pulse signal d occurs.

Therefore, according to this second embodiment, the error which occurs due to the finite number of teeth on a gear wheel which is located on the flywheel 18 opposing the capstan pickup head 33, for example, may be compensated for by positioning the leading edges of the reproduced control pulse signal c and the rotation detection pulse signal e at substantially the same positions. Hence, according to this second embodiment, it is possible to stop the moving tape 15 at the most suitable position described before where the noise is not introduced at a conspicuous position in the reproduced picture during the still picture reproduction.

During the normal reproduction, the reproduced control pulse signal c from the control head 28 and the output pulse signal b of the flip-flop 26 are in phase. Thus, instead of the control pulse signal c, the pulse signal b shown in FIGS.2(B) and 6(B) may be applied to the AND-gate 40 as the reference signal.

Further, the present invention is not limited to these embodiments, but various variations and modifications may be made without departing from the scope of the present invention.

What is claimed is:

1. A system for reproducing a video signal in a still picture reproduction in a video signal reproducing apparatus, said reproducing apparatus comprising a capstan for driving and moving a magnetic tape which has a video signal pre-recorded on tracks formed obliquely to a longitudinal direction of said magnetic tape and has a control signal having a constant frequency pre-recorded on a control track formed in the longitudinal direction of said magnetic tape, a capstan motor for rotating said capstan, rotation detection pulse signal generating means for generating a rotation detection pulse signal responsive to a detection of a rotation of said capstan or said capstan motor, a plurality of rotary video heads for scanning over the oblique tracks on said magnetic tape so as to reproduce the pre-recorded video signal, and a control head for scanning over the control track on said magnetic tape so as to reproduce the control signal, said system comprising:

still picture reproduction mode signal generating means for generating a still picture reproduction mode signal during a still picture reproduction mode of said reproducing apparatus;

rotation stopping signal generating means for counting a predetermined number of pulses in the rotation detection pulse signal received from said rotation detection pulse signal generating means, after said still picture reproduction mode signal is generated from said still picture reproduction mode signal generating means, from a point in time when a reproduced control pulse signal from said control head or a signal in phase with the reproduced control pulse signal is first applied to said rotation stopping signal generating means as a reference signal, and for generating a rotation stopping signal as an output signal when said predetermined number of pulses are counted;

reducing means responsive to the still picture reproduction mode signal generated from said still picture reproduction mode signal generating means, for reducing a voltage which is applied to said capstan motor; and stopping means for stopping the rotation of said capstan motor responsive to said rotation stopping signal which is applied to said stopping means after said voltage applied to said capstan motor has been reduced and a rotational speed of said capstan motor has decreased, said predeterined number being selected to a value so that said magnetic tape stops moving at a position where a noise in a reproduced picture which is obtained from the video signal reproduced by said rotary video heads is a minimum.

2. A system as claimed in claim 1 in which said rotation stopping signal generating means comprises a flip-flop for producing a signal at a point in time, after said still picture reproduction mode signal is generated from said still picture reproduction mode signal generating means, when a reproduced control pulse signal from said control head or a signal in phase with the reproduced control pulse signal is first applied to said rotation stopping signal generating means as a reference signal, a down-counter loaded with a predetermined preset value when said still picture reproduction mode signal is generated from said still picture reproduction mode signal generating means and supplied with said rotation detection pulse signal from said rotation detection pulse signal generating means as a clock signal responsive to an output signal of said flip-flop, for counting down the pulses in the rotation detection pulse signal by said predetermined preset value and for producing a borrow signal, and means supplied with the output borrow signal of said down-counter, for producing a pulse signal having a predetermined pulse width as said rotation stopping signal.

3. A system as claimed in claim 1 in which said rotation stopping signal is a reverse voltage applied to said capstan motor for a predetermined duration.

4. A system as claimed in claim 1 in which said reducing means comprises a reference voltage means for generating a constant reference voltage, and switching means for supplying the reference voltage from said reference voltage source to the reducing means responsive to said still picture reproduction mode signal.

5. A system as claimed in claim 1 in which said rotation stopping signal generating means is constituted by a microcomputer.

6. A system as claimed in claim 1 in which said rotation stopping signal generating means comprises first counter means for counting a predetermined number of pulses in the rotation detection pulse signal received from said rotation detection pulse signal generating means, after said still picture reproduction mode signal is generated from said still picture reproduction mode signal generating means, from a point in time when a reproduced control pulse signal from said control head or a signal in phase with the reproduced control pulse signal is first applied to said rotation stopping signal generating means as a reference signal, and for generating an output signal when said predetermined number of pulses are counted, an oscillator means for producing an oscillation output having a predetermined frequency, 1/N-frecuency dividing means for frequency-dividing the oscillation output of said oscillator means by 1/N, where N is a natural number greater than or equal to two, second counter means for starting count of the oscillation output of said oscillator means, after said still picture reproduction mode signal is generated from said still picture reproduction mode signal generating means, from a point in time when a reproduced control pulse signal from said control head or a signal in phase with the reproduced control pulse signal is first applied to said rotation stopping signal generating means as a reference signal, said second counter means interrupting the count thereof when said first counter means starts counting, and producing an output signal when the count in said second counter means reaches a specific number after the counting of an output signal of said frequency dividing means is resumed from a point when the count in said first counter means reaches said predetermined number and said first counter produces an output signal therefrom, and producing means for producing said rotation stopping signal responsive to the output signal of said second counter means obtained after said first counter means produces an output signal.

* * * * *